UNITED STATES PATENT OFFICE.

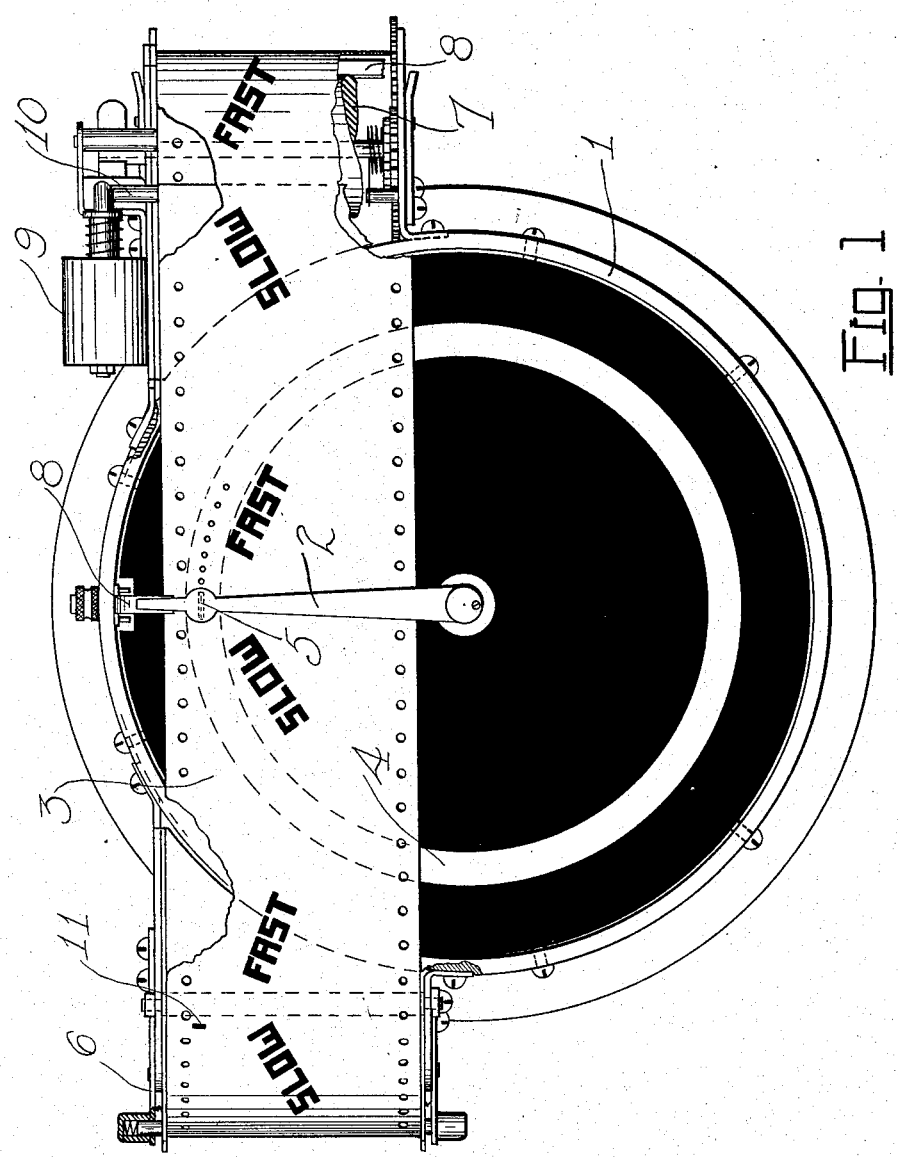

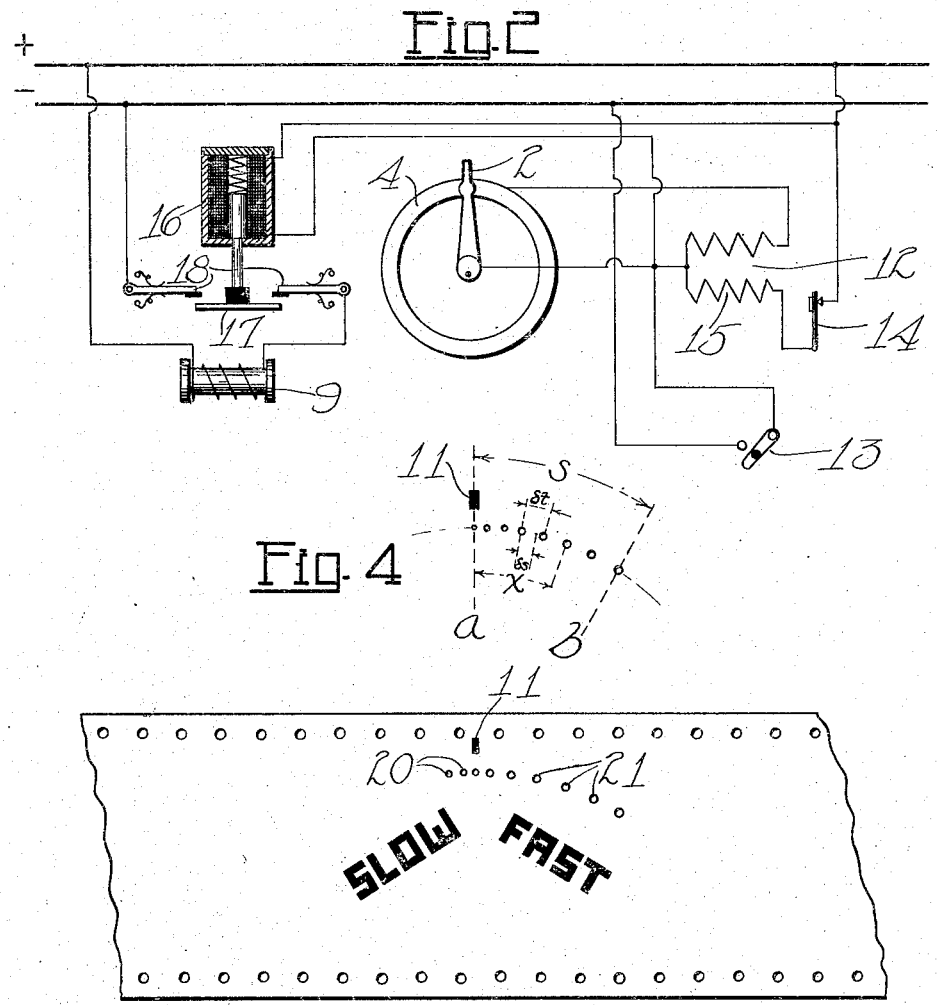

EDMUND O. SCHWEITZER, OF CHICAGO, ILLINOIS.

RECORD-SHEET AND METHOD OF MAKING THE SAME.

1,149,295.        Specification of Letters Patent.     Patented Aug. 10, 1915.

Original application filed August 12, 1911, Serial No. 643,709. Divided and this application filed December 21, 1914. Serial No. 878,233.

*To all whom it may concern:*

Be it known that I, EDMUND O. SCHWEITZER, a citizen of the United States, residing at Chicago, in the county of Cook and State of Illinois, have invented a certain new and useful Improvement in Record-Sheets and Methods of Making the Same, of which the following is a full, clear, concise, and exact description, reference being had to the accompanying drawings, forming a part of this specification.

My invention relates to a record sheet and method of making the same.

Heretofore, in recording actions or events the occurrence of which is influenced by a number of independent variables, it has been found difficult to record more than two variables upon a plane surface such as a chart or record sheet. For instance, in attempting to record the movement of a swinging pointer such as the pointer of an electrical indicating instrument, it has been found impossible to record legibly the variables of direction of swing, amplitude of movement and velocity of movement upon a stationary record sheet. The influence of any further variables such as would go to make up a fourth, fifth, etc., degree equation could obviously not be recorded since the record sheet itself consists only of two dimensional space being a plane surface.

Devices of the prior art have been built to record the occurrence of actions or events influenced by three independent variables by causing a uniform motion or translation of the record sheet itself with respect to the moving pointer. This has introduced a complication which has rendered the mechanism very cumbersome, unreliable and expensive in operation, but as the above described manner of recording has been the only one available heretofore, it has been found necessary in the prior art to adopt the same. It can be seen that any mechanism employing a record sheet, having a uniform motion is difficult to control, first of all because of the difficulties of feeding forward the record sheet, and second because the record sheet will necessarily be lengthy and difficult of access because of its length and expensive on account of the quantity of paper which must be fed forward.

The present invention is briefly described but not claimed in my copending application, Serial No. 643,709 filed August 12th, 1911, of which the present application is divisional.

The object of the present invention is to provide an improved record strip together with the means and method of making the same.

The present invention is especially applicable to recording transient effects or phenomena and I have chosen to illustrating the same as embodied in mechanism for recording the operation of synchronizing alternating current generators. The pointer of the synchroscope moves with a variable velocity, variable amplitude and variable direction and it is these three independent variables that I record upon the stationary record sheet which is part of the present invention.

In the accompanying drawings which form a part of the present application, Figure 1 is a front elevation of a synchroscope having recording mechanism attached and showing the stationary record sheet which I employ. Fig. 2 is a diagrammatical representation of the mechanism for causing the impressions to be made upon the record sheet. Fig. 3 is an enlarged fragmentary view of a part of the record sheet shown in Fig. 1. Fig. 4 is an explanatory diagram.

In the structure shown in Fig. 1 the synchroscope 1 is provided with a pointer 2 moving over the face of the instrument with a variable speed and direction of movement. The record sheet 3 is fed across the face of the instrument between the face and the moving pointer. A ring 4 of conducting material is inlaid in the face of the instrument and forms a stationary terminal electrode coöperating with a movable electrode 5 attached to the underside of the moving pointer 2 and shown in dotted lines in Fig. 1. A paper strip 3 is fed from a roller 6 at the left of the instrument across a feeding roller 7 to a take-up spool 8 back of the same. A spring motor not shown, feeds the paper forward at intervals as may be determined by a releasing electro-magnet 9, the armature of which normally engages a pin 10 on the feed roller to hold the record strip in a stationary position. This allows the record strip to move forward a predetermined distance each time the electro-magnet 9 is energized all as is more fully set out in the parent application. The electro-magnet 9 is energized by means of circuit arrangement shown in Fig. 2 immediately after each recording operation. The record strip 3 is provided with a reference mark 11 to indicate the zero or reference position and on the sides of the reference position are printed indications "slow" and "fast" to indicate to the switchman the condition of the machine which he is synchronizing with the machine in operation. This indication is given by the pointer 2. When two machines are to be connected the synchroscope is connected across the terminals of both. If the machine which is to be thrown in is rotating above synchronism, the pointer rotates in a clockwise direction, that is, it moves with reference to the zero point in the direction of the legend "fast"; conversely if the machine is running below speed of synchronism the pointer 2 rotates counterclockwise or in the direction of the legend "slow". The mechanism for doing this forms no part of the present invention and is not herein illustrated. Suffice it to say that the speed of rotation in a given direction represents the degree in which the two machines are out of phase. An adjustable finger 8 is secured to the top of the instrument and marks definitely the zero position of the pointer 2. The paper feeding mechanism when operated advances the record strip sufficient to bring the reference mark 11 directly in alinement with the finger 8. The ring 4 and the electrode 5 are connected to the terminals of an induction coil which produces periodical pulsations of current which pass between the electrodes in the form of sparks and perforate the record sheet.

In Fig. 2, I have illustrated diagrammatically the circuit arrangement for operating the paper feed and the induction coil for causing perforations. A manual switch 13 which is closed simultaneously with closure of the controlling switch for the main oil switches which connect the incoming machines to the bus bars, closes the circuit of the primary of the induction coil to cause the sparks to pass at regular timed intervals between the ring and the pointer through the record sheet. The induction coil begins to operate at or just previous to the time when the machines are actually connected together. The vibrator 14 of the induction coil is in effect a pendulum and produces regularly timed breaks and makes of the current in the primary winding 15. As a consequence, the perforations in the paper will occur at regularly timed intervals, in order to produce the legible record as will be described later. Closing of the switch 13 also closes the circuit of the controlling relay 16 to raise the contact 17 above the swinging terminals 18 of the actuating circuit for the magnet 9. Upon opening of the switch 13 the contact 17 is allowed to drop and close the circuit of the tripping magnet 9 in order to advance the record sheet to expose a fresh surface. It will be noted that the energizing circuit for the relays 9 is not closed on the upward movement of the contact 17 since the swinging arms 18 have protecting plates of insulation to prevent contact being made. However on the downward movement of contact 17 the circuit is closed and the paper feed is released. The feed of paper thus occurs immediately after a recording operation. The mechanism for advancing the record strip forms no part of the present invention, the same being claimed in the parent application.

In Fig. 3 I have shown on an enlarged scale, a record sheet upon which a record has been made. The perforations 20 on the left of the reference point 11, are shown as evenly spaced indicating that the pointer was moving with substantially uniform velocity. The perforations to the right of the reference mark 11 are spaced with increasing distance indicating that at this position the pointer was moving with increasing velocity.

I shall now explain with the aid of Fig. 4 the manner in which it is possible to record by a single linear graph the occurrence of an action or cycle of events which is affected by a plurality of independent variables. Assume that the pointer has described the path shown in the full line S of Fig. 4 and has left a record of this path by the perforations indicated by the small circles. The first variable which is recorded in a legible manner is the direction of motion from the reference point 11. This is known because the attendant or switchman always throws the switch when the pointer stands practically at zero. The next variable that may be legibly recorded is the distance or amplitude of movement which I have indicated by the reference character $a$. It is now important to determine the third variable factor, viz. speed or time-rate of movement of the pointer. Inasmuch as the perforations are made at regularly-timed intervals, the time represented by the distance between any two consecutive punctures may be represented by the character $dt$ indicating an increment of time. Considering the part of the path defined by lines $a$ and $x$, the mean speed during this part of the path may be represented by the equation $$V\frac{a}{x} = \int \frac{a}{x} \frac{ds}{dt}$$

in which equation $ds$ represents an increment of space as indicated on the diagram. But as above explained the increment of time is known to be constant the distance between spark punctures always representing uniform time intervals. Hence the above equation reduces to the following, $$V\frac{a}{x} = \int \frac{a}{x}\frac{1}{k}ds = \frac{1}{k}\int \frac{a}{x}ds$$

It can be seen that velocity at a given point on the path is proportioned to the space between punctures and that the mean speed would be proportional to the sum of the distances between successive sparks, divided by the number of spark punctures. It is also possible to determine the acceleration with which the pointer was moving by noting the rate of increase or decrease of distance between spark punctures.

From the above discussion it can be seen that I am able to record more than two variables upon a given plane in this case, a stationary record sheet.

The present invention is applicable not only to the recording of synchronizing of two generators but may be applied as well to recording the occurrence of any transient phenomenon such as the operation of voltmeters, ammeters and wattmeters in fact, of almost any electrical instrument as well as the action of lighting arresters and in fact the same is applicable in any situation in which it is desired to record the effect of a plurality of variables. The invention is not confined to the recording of three variables but may be employed in recording any number of variables. It is obvious that the manner in which my invention may be practised will be varied to meet different conditions of operation, the present disclosure being merely such a disclosure as is contemplated by the statutes in requiring an illustrative embodiment to be described.

I am employing the term "intensity" as describing the quality of the graph, which has to do with the spacing of the punctures of which it is composed. If the punctures are closer together, I consider the graph to be more intense; and, if they are farther apart, I consider the graph to be less intense.

What I claim as new and desire to protect by Letters Patent is the following:

1. The method of recording the continuous movement of a pointer which consists in causing a series of instantaneous impressions to be made upon a stationary surface at regularly-timed intervals, said impressions showing the position of said pointer at those instants.

2. The method of recording the continuous movement of a swinging pointer which consists in causing a series of consecutive impressions to be made of the instantaneous position of said pointer at regularly timed intervals.

3. The method of recording an action or phenomenon which consists in causing a pointer to move in a linear path over a stationary record sheet, in causing said pointer to move in a continuous manner with variable speed in accordance with the progress of said action and simultaneously causing a series of consecutive impressions of the instantaneous position of the pointer to be made on the record sheet at regular time intervals.

4. The method of recording upon a stationary record sheet the extent and speed of movement of a moving pointer which consists in passing a series of sparks between the pointer and the record sheet at brief regularly timed intervals to cause a series of punctures showing the successive positions of said pointer during its continued movement.

In witness whereof, I hereunto subscribe my name this 19th day of December A. D. 1914.

EDMUND O. SCHWEITZER.

Witnesses:
ERNEST W. RAPALEE,
ROBERT D. SURGEON.